W. HART.
Indicator for Stills.
No. 65,078.
Patented May 28, 1867.
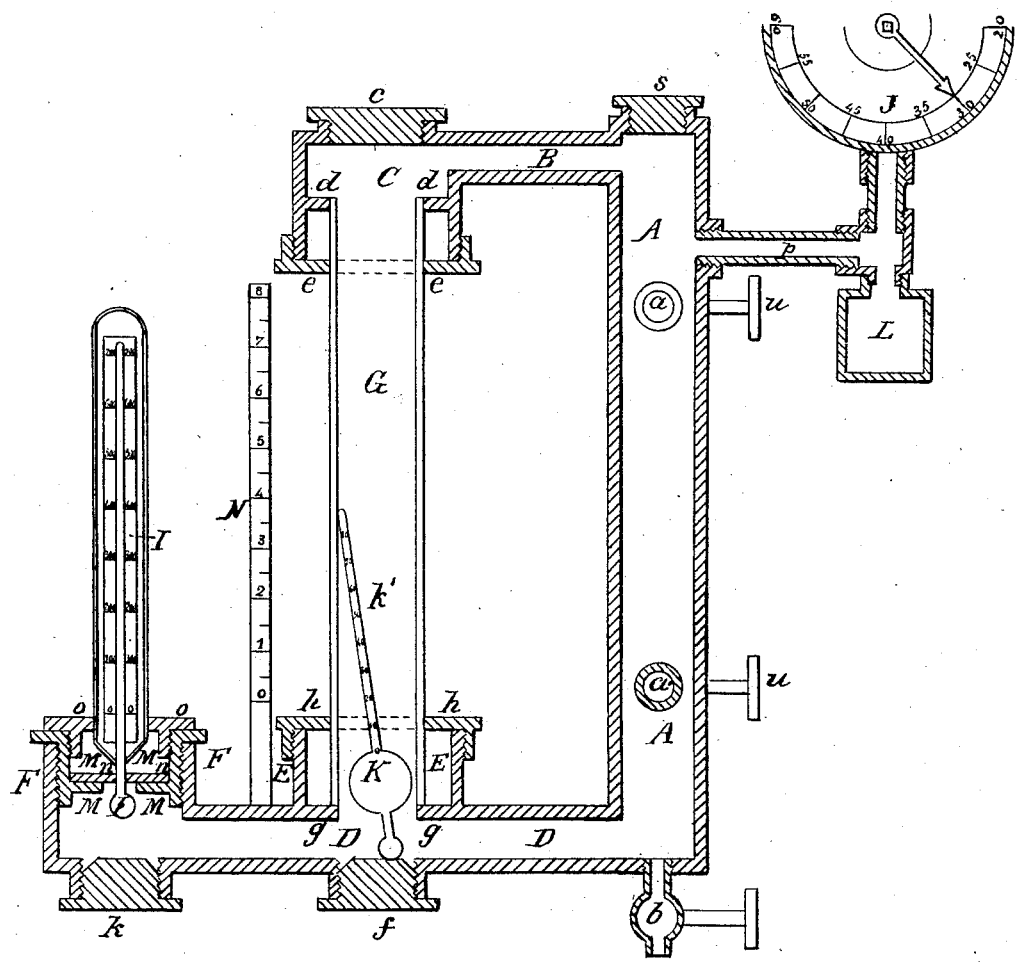
Witnesses
Jn? D. Patton
Thos. J. Chamberlain
Inventor
Walter Hart.
By atty A.B. Stoughton

United States Patent Office.

WALTER HART, OF PHILADELPHIA, PENNSYLVANIA.

Letters Patent No. 65,078, dated May 28, 1867.

---

IMPROVED INDICATING APPARATUS FOR OIL AND OTHER STILLS.

---

The Schedule referred to in these Letters Patent and making part of the same.

---

TO ALL WHOM IT MAY CONCERN:

Be it known that I, WALTER HART, of the city of Philadelphia, and State of Pennsylvania, have invented a new and useful apparatus to be attached to and used in connection with hydrocarbon and other distilleries, for indicating and giving information in and as to the various stages of the process, and the condition of the fluids, liquids, or residuums, the results of distillation; and that the following is a full, clear, and exact description of the same, reference being had to the accompanying drawing, which represents a vertical section through the apparatus.

My invention consists in a new and useful instrument for the purpose of giving to distillers of hydrocarbons and other substances information of great value, and of a character much desired, but which, up to the present time, has not been obtained with any degree of accuracy or certainty. The instrument in question affords at all times a full knowledge of the depth and quantity, in inches and gallons, of the material within the still or other vessel to which it may be attached. It likewise gives the density or specific gravity, the temperature, the rate of evaporation; and, by drawing off some of the contents of the apparatus, exact knowledge of its condition and quality can be obtained at any period of the process of distillation. It also indicates the quantity of vapor generated. The above are some of the most particular and important uses of this instrument, and by observance of these the distiller or attendant will be guided or instructed as to the best form of still, condenser, furnace, and the arrangement of the same. The instrument or apparatus will also give accurate and immediate knowledge of the quantities of the different materials his hydrocarbons yield in their distillation, a matter now arrived at only through a very troublesome, and, at best, imperfect way. When this instrument or apparatus is attached to or connected with boilers in which salt water is evaporated, it will give the point of saturation. And the instrument or apparatus will also show whether the hydrocarbons or other liquids that are being distilled, and of which such information may be desired, separate their lighter from their heavier parts by being permitted to rest quiescent, and if so, what are the facts or causes of such separation.

To enable others skilled in the art to make and use my invention, I will proceed to describe the same with reference to the drawings.

The apparatus, in whole or in part, may be encased in a box or frame with suitable glass set in it to protect it from injury, and more especially to protect the glass tubes from sudden cold when in their heated condition, and so that it may be inspected from the outside, and accessible by suitable doors or slides.

A is a metal tube of such length as always to be, when in working position, some inches above the filling line, and some inches below the bottom of the still to which it is attached. $a$ and $a'$ are tubes or pipes intersected by valves or cocks, $u\ u'$, which connect the tube A with the still, and also serving as the avenues or means by which the vapor, when generated, and the liquid contents at all times, can be passed from the still to said tube, the valves or cocks $u\ u'$ controlling or cutting off, when necessary, such supply. The tubes and cocks may be increased in number, so as to give the flow of liquid from any level or point in the still. $b$ is a draw-off cock through which the contents of the entire apparatus can be at any time discharged, and may be placed on any part of the apparatus where it will effect its object and purpose. A screw-cap or top, $s$, is put upon the top of the tube A, so that access may be had to its interior to clean it out when fouled. A tubular or hollow arm, B, projects from the upper part of the tube A, (and some inches above the branch tube or pipe $a$, in said tube A,) and has an enlargement, C, at its termination. This arm B serves the purpose of arranging the chamber C at such distance from the tube A as may be desired, and also of carrying the vapor from the tube A to the chamber C, whence it is supplied to a glass tube, G, the upper end of which is secured to and terminates in the chamber C. A screw-cap, $c$, is placed over the chamber C, through which the glass tube may be put or taken out for the cleansing or any other purpose. The under part of the chamber C has also a screw-cap, $e$, upon it, and this cap makes a flange for holding and steadying the glass tube G, and also, in connection with the flange $d$, forms a packing-chamber by which the glass tube can be properly packed to make its connection with the chamber C tight. The lower end of the tube G connects with a passage, D, that connects with the bottom of the tube A also, and which passage is also common to the bulb of the thermometer I, as will be explained hereafter. The under or lower end of the tube G is held in place by the cap $h$, which runs on to the cylinder E with a screw-thread, and by the flange $g$ at the bottom of the cylinder, and the space between the cap and the nange is used for a packing-chamber to pack the end of or the joint between the glass tube and its adjacent parts. Underneath the glass tube, and in a vertical line with it, there is an opening which is closed by a screw-cap, $f$, through which opening the hydrometer K can be inserted into the glass tube, or removed therefrom at pleasure. At the end of the passage D most remote from the tube A there is another cylindrically-formed box or case, F, for containing the thermometer I, and this case or chamber is accessible through an opening underneath, which is covered by a screw-cap, $k$. A cup, M, is screwed into the top of the cylinder F, for supporting, by means of a divided bottom, $n$, the lower end of the glass tube of the thermometer I, the bulb of the thermometer passing through the bottom of the cup M, and projecting into the chamber D or F, so as to be influenced by the temperature therein. A screw-cap, $o$, is run into the top portion of the cup M, and the space in between this cap $o$ and the false bottom $n$ and the interior of the cup M, is used for a packing-chamber for packing the thermometer to the apparatus supporting it. J is a pressure-gauge, and is connected to the tube A by a pipe, $p$, which pipe should be above the uppermost pipe or tube $a$; and L is a chamber below the pressure-gauge, to receive the condensed vapor, whence it may be drawn off in any of the usual ways. The hydrometer float and stem K is placed in the glass tube G, and is free to rise and fall therein, according to the height of the liquid in said tube, which forms the hydrometer jar. The stem of the hydrometer float is marked with figures, which can be readily seen through the glass, and alongside of the glass tube G there is placed a scale or indicator, marked in inches, to show the height of the liquid in G, which corresponds with the height of the liquid in the still, and this scale may be further graduated to show the number of gallons in the still. The thermometer is enclosed in a glass tube, and is marked in the usual way for indicating degrees of temperature, which marks can be distinctly seen from the outside. Thus, through or by means of the tube G and scale N, the depth and quantity, in inches and gallons, of the material in the still is always known. And by means of the float and stem, and its marks $k$, the density or specific gravity of the liquid is known. At I the temperature is indicated, and by drawing off a small quantity at $b$, its color and consistency can be seen. So at all times during the process of distillation, the attendant may know all that is advantageous for him to know in relation to the products. In a word, it enables him to know precisely what is going on within the still without being able to look into it.

Having thus fully described my invention, what I claim therein as new, and desire to secure by Letters Patent, is—

An apparatus, substantially such as described, which, when applied to a still or other evaporating vessel, will show externally the quantity, specific gravity, temperature, pressure, color, and rate of evaporation of the contents of the still, by means of passages and indicators, substantially as described.

WALTER HART.

Witnesses:
    A. B. STOUGHTON,
    EDM. F. BROWN.